United States Patent
Kawano et al.

(10) Patent No.: US 8,341,840 B2
(45) Date of Patent: Jan. 1, 2013

(54) METHOD OF REPAIRING BEARING OF WIND TURBINE GENERATOR

(75) Inventors: Keiichirou Kawano, Tokyo (JP); Kaoru Iwasaki, Tokyo (JP); Yuji Matsunami, Tokyo (JP); Shiro Takada, Tokyo (JP); Yukio Akizuki, Tokyo (JP); Hiroaki Takeuchi, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 12/675,006

(22) PCT Filed: Feb. 10, 2010

(86) PCT No.: PCT/JP2010/051933
§ 371 (c)(1),
(2), (4) Date: May 11, 2010

(87) PCT Pub. No.: WO2011/099120
PCT Pub. Date: Aug. 18, 2011

(65) Prior Publication Data
US 2012/0055024 A1    Mar. 8, 2012

(51) Int. Cl.
*B23P 6/00* (2006.01)
(52) U.S. Cl. ....... 29/889.1; 29/889; 29/889.3; 29/889.6; 290/44; 290/55; 384/494
(58) Field of Classification Search .......... 29/889, 29/889.1, 889.3, 889.6, 889.61; 290/44, 290/55; 384/494, 453, 563
See application file for complete search history.

(56) References Cited

U.S. PATENT DOCUMENTS

| | | | |
|---|---|---|---|
| 5,215,384 A | 6/1993 | Maier | |
| 6,637,942 B2 | 10/2003 | Dourlens et al. | |
| 7,572,061 B2* | 8/2009 | Fox et al. | 384/494 |
| 8,104,631 B2* | 1/2012 | Stegemann et al. | 212/179 |
| 2010/0219642 A1 | 9/2010 | Kim et al. | |

FOREIGN PATENT DOCUMENTS

| | | |
|---|---|---|
| DE | 2847979 | 5/1980 |
| GB | 647187 | 4/1951 |
| JP | H07-35147 A | 2/1995 |
| JP | 2004-108164 A | 4/2004 |
| JP | 2007-132418 | 5/2007 |
| JP | 2008-303914 | 12/2008 |
| JP | 2008-546948 | 12/2008 |
| JP | 2009-063100 | 3/2009 |
| JP | 2009-063101 | 3/2009 |

OTHER PUBLICATIONS

WIPO, "International Preliminary Report on Patentability" of Aug. 14, 2012 for PCT/JP2010/051933.

* cited by examiner

*Primary Examiner* — Richard Chang
(74) *Attorney, Agent, or Firm* — Manabu Kanesaka; Kenneth M. Berner; Benjamin J. Hauptman

(57) ABSTRACT

A method of repairing a bearing of a wind turbine generator is provided which is able to more permanently repair a gap which occurred between a constituent member of the wind turbine generator and a bearing ring of the bearing. For example, in the case of repairing the gap 13 between the main shaft outer cylinder 10 of the wind turbine generator 1 and the outer ring 12A of the main bearing 12, the plate 40 is inserted between the main shaft outer cylinder 10 and the outer ring 12A, and also the plate 40 is fixed to an inner circumferential surface of the main shaft outer cylinder 10 by the adhesive agent 41. On the other hand, slip is permitted between the plate 40 and the outer ring 12A of the main bearing 12.

10 Claims, 5 Drawing Sheets

METHOD OF REPAIRING BEARING OF WIND TURBINE GENERATOR

RELATED APPLICATIONS

The present application is National Phase of International Application No. PCT/JP2010/051933 filed Feb. 10, 2010, the disclosure of which is hereby incorporated by reference herein in its entirety.

BACKGROUND OF THE INVENTION

1. Field of the Invention

The present invention relates to a method of repairing a bearing of a wind turbine generator and in particular, to a bearing repairing method which fills up a gap between a constituent member such as a housing member or a shaft member of a wind turbine generator and a bearing ring of a bearing.

2. Description of the Related Art

In recent years, from the viewpoint of conservation of the global environment, the spread of wind turbine generators which use wind power as one form of renewable energy is progressing.

A wind turbine generator is generally constituted by a rotor head to which blades are attached, a nacelle which houses a rotary shaft and a generator, and a tower which supports the nacelle. Also, in order to improve power generation efficiency, yaw rotation which swivels the nacelle in accordance with the state of the wind, or pitch control which rotates the blades in a pitch direction is often performed.

In such a wind turbine generator, a variety of bearings are used which are typified by a main bearing which supports a main shaft so as to be able to rotate, a bearing (bearing of a nacelle rotation mechanism) which supports a nacelle bedplate on the tower so as to be able to swivel, and a bearing (bearing of a pitch driving mechanism) which supports the blades on the rotor head side so as to be able to rotate.

For example, in Patent Documents 1 and 2, as a bearing which is used for the main bearing of the wind turbine generator, or the like, there are described self-aligning roller bearings having a configuration in which a bearing ring is divided at a flat surface parallel to the axis of rotation, and the divided rings are tightened by a bolt. In the self-aligning roller bearings, since the bearing ring is divided, the repair or the exchange of the bearing is able to be easily performed.

PRIOR ART

Patent Document 1: Japanese Patent Application Laid-Open No. 2009-63100
Patent Document 2: Japanese Patent Application Laid-Open No. 2009-63101

SUMMARY OF THE INVENTION

However, even if the bearings described in Patent Documents 1 and 2 are used in the wind turbine generator, there is a case where the following problems occur.

That is, in the bearing of the wind turbine generator, each bearing ring (an inner ring or an outer ring) of the bearing is fixed to a constituent member (hereinafter, referred to as a "member on the apparatus side") such as a housing member or a shaft member of the wind turbine generator. However, the bearing ring of the bearing is rotated with respect to the member on the apparatus side due to a sudden high-load, so that the member on the apparatus side is often reduced in thickness due to friction between the bearing ring and the member on the apparatus side. If the reduction in thickness of the member on the apparatus side progresses, a gap occurs between the member on the apparatus side and the bearing ring of the bearing, so that there is a case where the bearing ring which should remain fixed to the member on the apparatus side under normal circumstances relatively idles with respect to the member on the apparatus side, so that a bearing function is not fulfilled.

Therefore, it is considered to perform repair by filling the gap which occurred between the member on the apparatus side and the bearing ring of the bearing with a metal shim and liquid resin, and then solidifying the liquid resin. However, even if such repair is performed, in a case where a high load due to, for example, strong wind suddenly acts on the bearing, the resin (solidified liquid resin) is broken due to a shear force, so that there is a danger that the metal shim will fall out or a filling defect will occur. Therefore, a method of more permanently repairing the gap which occurred between the member on the apparatus side and the bearing ring of the bearing is required.

The present invention has been made in view of the above-mentioned circumstances and has an object to provide a method of repairing a bearing of a wind turbine generator, which is able to more permanently repair a gap which occurred between a member on the apparatus side and a bearing ring of the bearing.

A method of repairing a bearing of a wind turbine generator, according to the present invention, includes the step of inserting a plate between a constituent member of the wind turbine generator, which is fixed to a bearing ring of the bearing, and the bearing ring of the bearing; and the step of fixing the plate to the constituent member of the wind turbine generator, wherein slip is permitted between the plate and the bearing ring of the bearing.

In the method of repairing a bearing of a wind turbine generator, since the plate is inserted between the constituent member (the member on the apparatus side) of the wind turbine generator and the bearing ring of the bearing, and also the plate is fixed to the member on the apparatus side, a gap which occurred between the member on the apparatus side and the bearing ring of the bearing is able to be filled by the plate. In addition, since slip is permitted between the plate and the bearing ring of the bearing, even in a case where a high load due to strong wind suddenly acts on the bearing, an excessive shear force is not applied to the plate. Accordingly, since the filling state of the plate is not deteriorated due to an excessive shear force, the gap which occurred between the member on the apparatus side and the bearing ring of the bearing is able to be more permanently repaired.

Incidentally, "slip being permitted" between the plate and the bearing ring of the bearing means a state where the plate is not positively fixed to the bearing ring. Specifically, it refers to a state where the plate and the bearing ring once come into contact with each other, but relatively slip in a case where an external force exceeding a static frictional force between the plate and the bearing ring acts.

Also, the "constituent member of the wind turbine generator" refers to all members which are fixed to the bearing ring of the bearing in the wind turbine generator, and means, for example, a main shaft inner cylinder and a main shaft outer cylinder, which are fixed to bearing rings of a main bearing of the wind turbine generator, blades and a rotor hub, which are fixed to a bearing ring of a bearing of a pitch driving mechanism, or a nacelle bedplate and a tower, which are fixed to a bearing ring of a bearing of a nacelle rotation mechanism.

In the method of repairing a bearing of a wind turbine generator, it is preferable that the plate be divided into a plurality of pieces including a wedge piece, and in the step of inserting the plate, the plurality of pieces except the wedge piece be inserted between the constituent member of the wind turbine generator and the bearing ring of the bearing, and then the wedge piece be fitted.

In this manner, by using the plate divided into a plurality of pieces, it is possible to easily perform the insertion of the plate between the member on the apparatus side and the bearing ring of the bearing.

Also, by inserting the plurality of pieces except the wedge piece between the member on the apparatus side and the bearing ring of the bearing, and then finally fitting the remaining wedge piece, adjacent pieces come into close contact with each other, and also each piece is pressed against the member on the apparatus side. Accordingly, the gap between the member on the apparatus side and the bearing ring of the bearing is able to be reliably filled by the plate.

In the method of repairing a bearing of a wind turbine generator, it is preferable that the plate be made of a resin material having a specific abrasion amount of $1.0 \times 10^{-9}$ mm$^3$/Nmm or less and a coefficient of static friction of 0.15 or less.

In this manner, by making the specific abrasion amount of the plate (resin material) be $1.0 \times 10^{-9}$ mm$^3$/Nmm or less, even in a case where a high load is applied to the bearing, so that slip occurs between the plate and the bearing ring of the bearing, the abrasion amount of the plate is reduced, so that a filling state by the plate is able to be maintained for long periods.

Also, by making the coefficient of static friction of the plate (resin material) be 0.15 or less, relative slip between the plate and the bearing ring occurs at a point in time when a relatively low load is applied to the bearing, so that an excessive shear force is reliably prevented from being applied to the plate.

In the method of repairing a bearing of a wind turbine generator, it is preferable that the method further include the step of cutting away an end face of the constituent member in the surroundings of the bearing ring so that an insertion opening for inserting the plate between the constituent member and the bearing ring is formed, before the step of inserting the plate.

The reduction in thickness of the member on the apparatus side, which occurs due to the fact that the bearing ring rotates with respect to the member on the apparatus side due to a sudden high-load, does not always progress at a constant speed in relation to an axial direction of the bearing. For example, in a case where an end face of the member on the apparatus side is protruded further outward than an end face of the bearing ring of the bearing, the reduction in thickness of the member on the apparatus side hardly occurs in the protruded end face of the member on the apparatus side. In such a case, a non-thinning portion of the end face of the member on the apparatus side stands in the way, so that it is difficult to insert the plate for repair between the member on the apparatus side and the bearing ring.

Therefore, as described above, before the insertion of the plate, by cutting away the end face of the member on the apparatus side in the surroundings of the bearing ring of the bearing, thereby forming a plate insertion opening in advance, it is possible to easily insert the plate for repair between the member on the apparatus side and the bearing ring.

In the method of repairing a bearing of a wind turbine generator, the constituent member may also be a main shaft outer cylinder of the wind turbine generator, and the bearing may also be a main bearing in which an outer ring is fixed to the main shaft outer cylinder.

Since the power of the wind which the blades are subjected to is always applied to the main bearing of the wind turbine generator as a load, in particular, the reduction in thickness of the main shaft outer cylinder fixed to the outer ring of the bearing easily progresses. It is effective if the main shaft outer cylinder in which the reduction in thickness easily progresses in this manner is repaired by the bearing repairing method described above.

In this case, the main bearing may also be separated from a nacelle bedplate of the wind turbine generator.

In this manner, in a case where the main bearing is separated from the nacelle bedplate, even in a state where the main bearing is attached to the main shaft inner cylinder and the main shaft outer cylinder of the wind turbine generator, it is possible to insert the plate into the gap between the outer ring of the main bearing and the main shaft outer cylinder over the entire circumference of the main bearing. Accordingly, the repair is able to be performed by the bearing repairing method described above, without detaching the main bearing from the wind turbine generator, so that work efficiency is greatly increased.

In the present invention, since the plate is inserted between the constituent member (the member on the apparatus side) of the wind turbine generator and the bearing ring of the bearing, and also the plate is fixed to the member on the apparatus side, the gap which occurred between the member on the apparatus side and the bearing ring of the bearing is able to be filled by the plate. In addition, since slip is permitted between the plate and the bearing ring of the bearing, even in a case where a high load due to strong wind suddenly acts on the bearing, an excessive shear force is not applied to the plate. Accordingly, since the filling state of the plate is not deteriorated due to an excessive shear force, the gap which occurred between the member on the apparatus side and the bearing ring of the bearing is able to be more permanently repaired.

DETAILED DESCRIPTION OF THE PREFERRED EMBODIMENTS

Hereinafter, an embodiment of the present invention will be described with reference to the accompanying drawings. Unless specific description is particularly provided, however, dimensions, materials, shapes, relative arrangement, and so on of constituent parts which are described in the embodiment are not intended to limit the scope of the invention only thereto, but shall be interpreted as illustrative only.

In the following, first, one example of a wind turbine generator to which a bearing repairing method according to the present invention is applied will be described, and then the bearing repairing method according to the present invention will be described in detail. Also, here, although a wind turbine generator of a so-called synchronous generator form is described as one example of the wind turbine generator, it goes without saying that the bearing repairing method according to the present invention is able to be applied to not only the wind turbine generator of a synchronous generator form, but also wind turbine generators of other forms including a so-called induction generator form.

Figure 1:
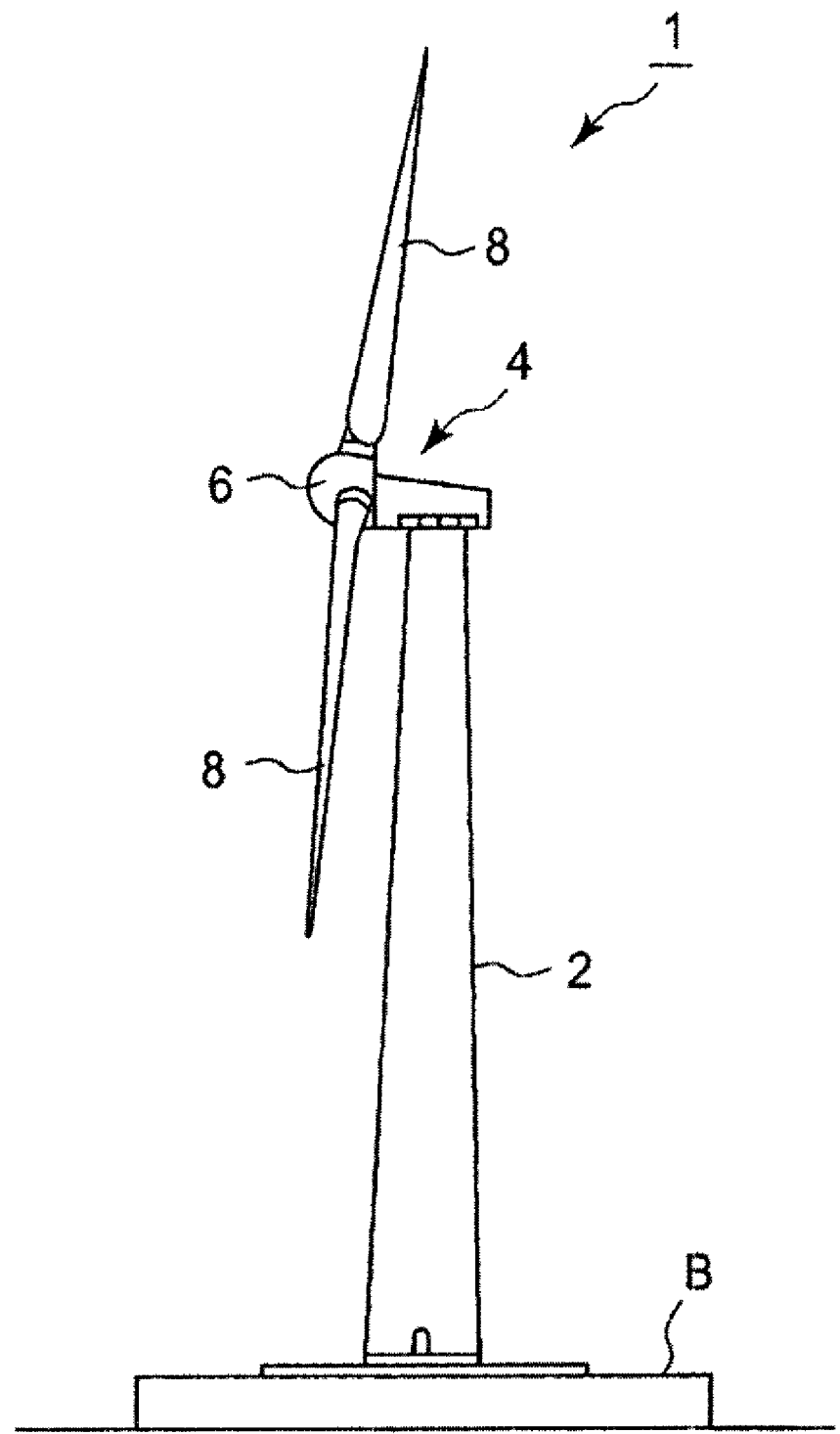
FIG. 1 is a diagram illustrating an example of the overall configuration of a wind turbine generator.

FIG. 1 is a diagram illustrating an example of the overall configuration of a wind turbine generator related to this embodiment.

As shown in FIG. 1, a wind turbine generator 1 mainly includes a tower 2 provided to stand on a foundation B, a nacelle 4 mounted on the upper end of the tower 2, a rotor head 6 mounted on the nacelle 4, and a plurality of blades 8 attached to the rotor head 6.

The tower 2 is of a columnar shape extending upwardly (to the upper side of FIG. 1) from the foundation B, as shown in FIG. 1, and, for example, may also be constituted by a single columnar member or constituted into a columnar shape by a plurality of units coupled to each other in the up-and-down direction. In a case where the tower 2 is constituted by a plurality of units, the nacelle 4 is mounted on the unit provided at the uppermost section.

The nacelle 4 supports the rotor head 6 so as to be able to rotate, and also houses various mechanisms such as a generator and a nacelle rotation mechanism therein. The plurality of blades 8 are attached to the rotor head 6 in a radial fashion with the rotor head 6 as a center. In this way, if the blades 8 are subjected to the wind, the blades 8 and the rotor head 6 to which the blades are attached rotate about an approximately horizontal axis, and the rotation is transmitted to the generator in the nacelle 4, so that electric generation is performed.

Figure 2:
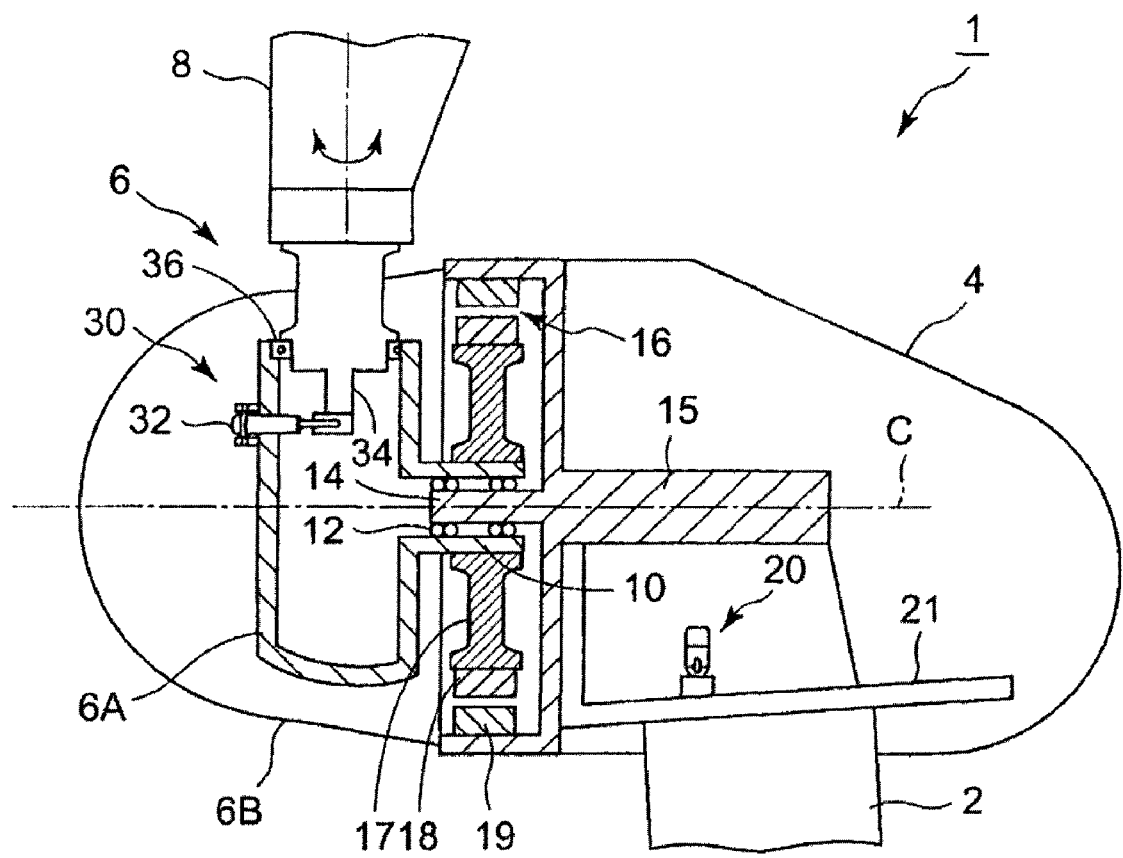
FIG. 2 is a diagram illustrating an example of the inner configurations of a rotor head and a nacelle of the wind turbine generator shown in FIG. 1.

FIG. 2 is a diagram illustrating an example of the inner configurations of the rotor head 6 and the nacelle 4. As shown in the drawing, the rotor head 6 is fixed to the nacelle 4 so as to be able to rotate about an approximately horizontal axis (a rotary shaft C) and constituted to include a rotor hub 6A to which the blades 8 are attached, and a head capsule 6B which covers the rotor hub 6A.

The rotor hub 6A has a main shaft outer cylinder 10 formed into a cylindrical shape with the rotary shaft C as a center. When the blades 8 are subjected to the power of the wind, the main shaft outer cylinder 10 rotates along with the rotary hub 6A about the rotary shaft C. The main shaft outer cylinder 10 is supported on a main shaft inner cylinder 14 through a main bearing 12 so as to be able to rotate.

The main shaft inner cylinder 14 has a cylindrical shape with the rotary shaft C as a center and is formed at a support member 15 which is a fixing system which does not rotate. Also, the support member 15 is fixed to a nacelle bedplate 21 of a nacelle rotation mechanism 20 which will be described later.

A generator 16 is mounted on the main shaft outer cylinder 10 which is supported on the main shaft inner cylinder 14 through the main bearing 12 so as to be able to rotate. The generator 16 is a so-called synchronous generator and is constituted to include a generator rotor 17, a rotator 18, and a stator 19.

The rotator 18 of the generator 16 is constituted by multi-polar (for example, 96-pole) magnets, and specifically, magnets of N pole and S pole are alternately arranged being spaced to each other over the entire circumference of the generator rotor 17. Here, the generator rotor 17 is an annular member fixed to the outer circumference of the main shaft outer cylinder 10 and supports at its outer circumferential surface the rotator 18.

On the other hand, the stator 19 of the generator 16 has a configuration in which a number of coils are arranged being spaced to each other. The stator 19 is fixed to the support member 15, which is a fixing system, so as to face the rotator 18 supported on the generator rotor 17.

In the generator 16 having such a configuration, if the rotator 18 rotates with the rotation of the rotor hub 6A, an induced current is generated in the coils of the stator 19 which remains stationary. At this time, since the rotator 18 is multi-polar, even in a case where an angular velocity of the rotator 18 is small, the generator 16 is able to produce alternating-current electric power having a sufficiently high frequency. Also, the alternating-current electric power generated in the generator 16 is controlled to a given frequency and voltage by PWM (Pulse Width Modulation) control at an AC-DC-AC link, and then sent to an electric transmission system.

Further, in the wind turbine generator 1, as shown in FIG. 2, the nacelle rotation mechanism 20 is provided at the lower portion of the nacelle 4 and allows the nacelle 4 to perform yaw rotation in response with a wind direction.

Figure 3:
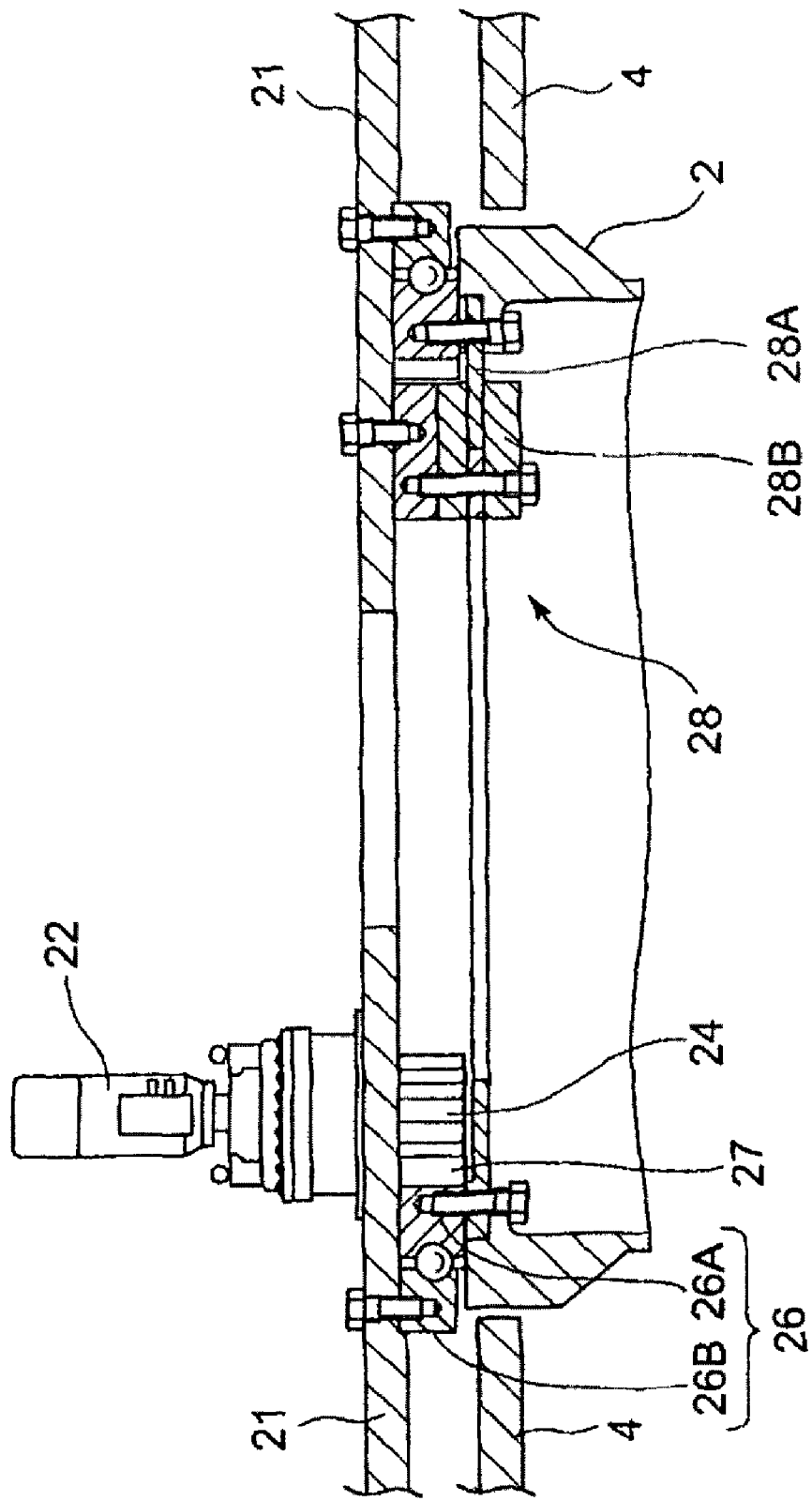
FIG. 3 is a cross-sectional view illustrating an example of the configuration of a nacelle rotation mechanism.

FIG. 3 is a diagram illustrating an example of the configuration of the nacelle rotation mechanism 20. As shown in the drawing, the nacelle rotation mechanism 20 is constituted by the nacelle bedplate 21, a yaw motor 22, a pinion 24 which is rotated by the driving of the yaw motor 22, a bearing 26 in which an internal gear 27 which is engaged with the pinion 24 is formed in an inner ring 26A, and a yaw braking mechanism 28 having a brake disc 28A and a brake shoe 28B. In the example shown in FIG. 3, the yaw motor 22, the pinion 24, an outer ring 26B of the bearing 26, and the brake shoe 28B are fixed on the nacelle bedplate 21 side, while the inner ring 26A of the bearing 26 and the brake disc 28A are fixed on the tower 2 side.

In this way, if the yaw motor 22 is driven, the pinion 24 rotates, so that the nacelle 4 (the nacelle bedplate 21) performs yaw rotation. Also, if the brake shoe 28B of the yaw braking mechanism 28 bites the brake disc 28A, the yaw rotation of the nacelle 4 (the nacelle bedplate 21) is braked.

Also, in the wind turbine generator 1, as shown in FIG. 2, the rotor hub 6A is provided with a pitch driving mechanism 30 which changes a pitch angle of the blade 8 by rotating the blade 8 about its axis (in the direction of an arrow in FIG. 2).

As shown in FIG. 2, the pitch driving mechanism 30 is constituted by a cylinder 32 attached to the rotor hub 6A and a shaft portion 34 connected to the blade 8. Further, the blade 8 is supported by a bearing 36 so as to be able to rotate in a pitch direction. Therefore, if the shaft portion 34 is rotated by the cylinder 32 of the pitch driving mechanism 30, the blade 8 is rotated in the pitch direction along with the shaft portion 34. Further, the pitch driving mechanisms 30 each provided for every blade 8 may also be made so as to be connected to each other by a link mechanism (not shown), thereby performing the control of the pitch angle of each blade 8 in conjunction with each other.

In the wind turbine generator 1 having such a configuration, a variety of bearings such as the main bearing 12 which supports the main shaft outer cylinder 10 on the main shaft inner cylinder 14 so as to be able to rotate, the bearing 26 of the nacelle rotation mechanism 20, and the bearing 36 of the pitch driving mechanism 30 are used. Here, since the wind turbine generator 1 is always exposed to an external force that is the wind, there is a case where a sudden load is applied to the bearings as well, so that members on the apparatus side (the constituent members of the wind turbine generator 1) adjacent to the bearings are reduced in thickness as follows.

Figure 4:
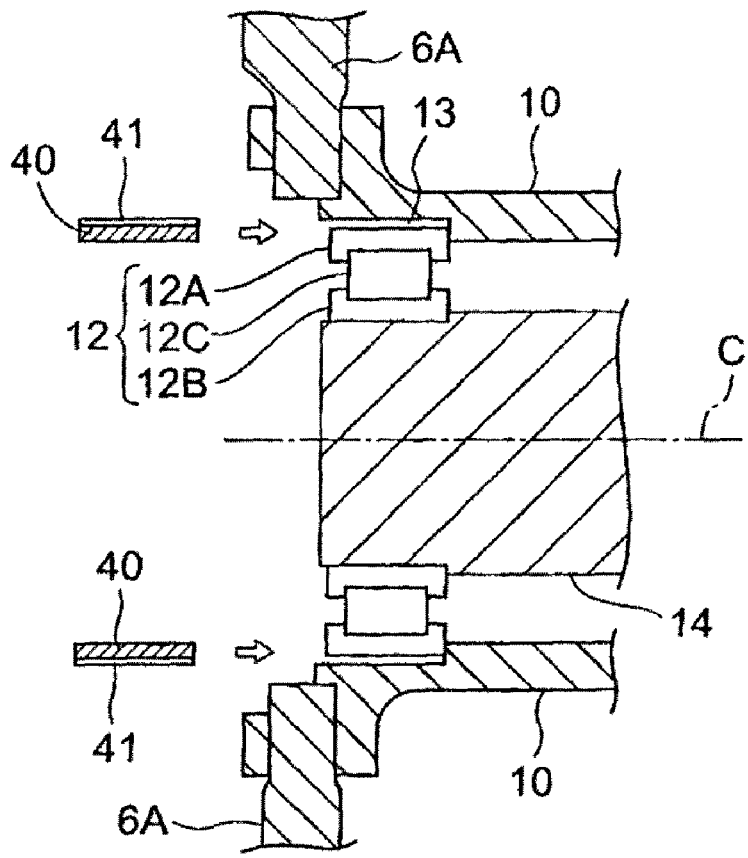
FIG. 4 is an enlarged view illustrating the surroundings of a main shaft outer cylinder and a main bearing of the wind turbine generator shown in FIG. 1.

FIG. 4 is an enlarged view illustrating the surroundings of the main shaft outer cylinder 10 and the main bearing 12 of the wind turbine generator 1 and shows a state in which the main shaft outer cylinder 10 of the wind turbine generator 1 is reduced in thickness. As shown in the drawing, the main shaft outer cylinder 10 is supported on the main shaft inner cylinder 14 by the main bearing 12. In addition, the main bearing 12 has a configuration in which a plurality of rolling elements (rollers) 12C are arranged between an outer ring 12A fixed to the main shaft outer cylinder 10 and an inner ring 12B fixed to the main shaft inner cylinder 14.

If a high load is suddenly applied to the main bearing 12, the main shaft outer cylinder 10 and the outer ring 12A relatively rotate, so that the main shaft outer cylinder 10 is reduced in thickness due to friction between the main shaft outer cylinder and the outer ring. Then, if the reduction in thickness of the main shaft outer cylinder 10 progresses, a gap 13 occurs between the main shaft outer cylinder 10 and the outer ring 12A, so that the outer ring 12A which should remain fixed to the main shaft outer cylinder 10 under normal circumstances relatively idles with respect to the main shaft outer cylinder 10, whereby a function as the main bearing 12 is not fulfilled. Therefore, it is necessary to restore the function of the main bearing 12 of the wind turbine generator 1 by a bearing repairing method as described below.

In addition, the thickness reduction phenomenon of the member on the apparatus side (the constituent member of the wind turbine generator 1) adjacent to the above-mentioned bearing is able to occur in the main shaft inner cylinder 14 as well, and a similar thickness reduction phenomenon is also able to occur in other bearings of the wind turbine generator 1. However, here, the bearing repairing method of this embodiment is described by taking as an example a case where the main shaft outer cylinder 10 which is located in the surroundings of the main bearing 12 of the wind turbine generator 1 has been reduced in thickness. However, needless to say, the bearing repairing method according to the present invention is also able to be applied to a case where the main shaft inner cylinder 14 has been reduced in thickness, and is also able to be applied to the bearings other than the main bearing 12 of the wind turbine generator 1.

In this embodiment, in a case where the gap 13 has occurred between the main shaft outer cylinder 10 and the outer ring 12A of the main bearing 12, as shown in FIG. 4, a plate 40 is inserted into the gap 13 from the direction of an arrow. In addition, it is preferable that the thickness of the plate 40 to be inserted is determined in accordance with the size of the gap 13.

Here, an adhesive agent 41 is coated only on the surface on the main shaft outer cylinder 10 side of the plate 40. In this way, the gap 13 is filled by the plate 40, and also the plate 40 is fixed to the inner circumferential surface of the main shaft outer cylinder 10 by the adhesive agent 41.

On the other hand, slip is permitted between the plate 40 and the outer circumferential surface of the outer ring 12A. Here, "slip being permitted" between the plate 40 and the outer circumferential surface of the outer ring 12A means a state where the plate 40 is not positively fixed to the outer ring 12A. Specifically, it refers to a state where the plate 40 and the outer ring 12A once come into contact with each other, but relatively slip in a case where an external farce exceeding a static frictional force between the plate and the outer ring acts.

In this manner, since slip is permitted between the plate 40 and the outer ring 12A, even in a case where a high load due to strong wind suddenly acts on the main bearing 12, the filling state of the plate 40 is not deteriorated due to an excessive shear force.

As for the plate 40, various materials such as a resin material and a rubber material are able to be used without being limited, provided that there is a characteristic which permits slip between the plate 40 and the outer ring 12A. For example, a resin material such as polytetrafluoroethylene (PTFE), high-density polyethylene (HDPE), polyethylene terephthalate (PETP), polybutylene terephthalate (PBTP), polyoxymethylene (POM), polyamide 6 (PA6), polyamide 66 (PA66), or polyimide (PI) is able to be used. Since a wide variety of bearings including the main bearing 12 of the wind turbine generator 1 are different in size, shape, and required strength, it is preferable to select the material of the plate 40 in consideration of strength or a manufacturing property in accordance with places to be repaired.

In particular, as the plate 40, it is preferable to use a resin material having a specific abrasion amount of $1.0 \times 10^{-9}$ mm$^3$/Nmm or less.

In this manner, by making the specific abrasion amount of the plate (resin material) 40 be $1.0 \times 10^{-9}$ mm$^3$/Nmm or less, even in a case where a high load is applied to the main bearing 12, so that slip occurs between the plate 40 and the outer ring 12A, the abrasion amount of the plate 40 is reduced, so that a filling state by the plate 40 is able to be maintained for long periods.

Also, as the plate 40, it is preferable to use a resin material having a coefficient of static friction of 0.15 or less.

In this manner, by making the coefficient of static friction of the plate (resin material) 40 be 0.15 or less, relative slip between the plate 40 and the outer ring 12A occurs at a point in time when a relatively low load is applied to the main bearing 12, so that an excessive shear force is prevented from being applied to the plate 40.

More preferably, from the viewpoint of making the long-term maintenance of the filling state of the plate 40 and the prevention of the application of an excessive shear force to the plate 40 coexist, as the plate 40, it is preferable to use a resin material having a specific abrasion amount of $1.0 \times 10^{-9}$ mm$^3$/Nmm or less and a coefficient of static friction of 0.15 or less.

Further, from the viewpoint of easy insertion of the plate into the gap 13 between the main shaft outer cylinder 10 and the outer ring 12A, it is preferable that the plate 40 is divided into a plurality of pieces.

Figure 5:
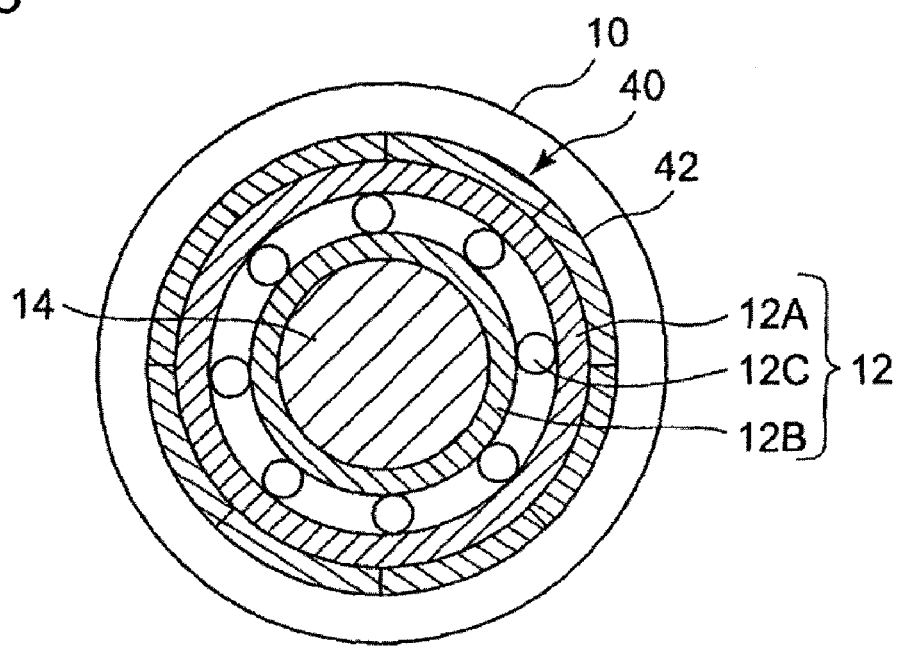
FIG. 5 is a plan view illustrating a state where a plate divided into a plurality of pieces is inserted between the main shaft outer cylinder and an outer ring of the main bearing.

FIG. 5 is a plan view illustrating a state where the plate 40 divided into a plurality of pieces is inserted into the gap 13. As shown in the drawing, the plate 40 divided into a plurality of pieces 42 is inserted between the main shaft outer cylinder 10 and the outer ring 12A of the main bearing 12. In this case, it is preferable that at least one of a plurality of pieces 42 have a wedge shape.

Figure 6:
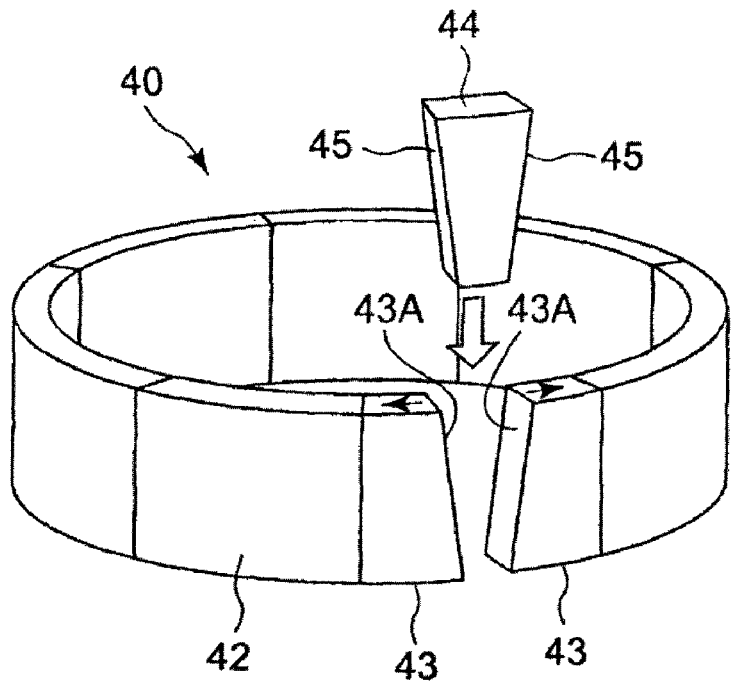
FIG. 6 is a perspective view illustrating the plate which is constituted by a plurality of pieces including a wedge piece.

FIG. 6 is a perspective view illustrating the plate 40 which is constituted by a plurality of pieces 42 including a wedge-shaped piece. As shown in the drawing, one of a plurality of pieces 42 divided is a wedge piece 44 having a wedge shape which has inclined surfaces 45 and decreases in width from one end toward the other end. In addition, a pair of pieces 43 have inclined surfaces 43A corresponding to the inclined surfaces 45 of the wedge piece 44 and are brought into close contact with the wedge piece 44.

When using such a plate 40, it is preferable to first, insert a plurality of pieces 42 and 43 except the wedge piece 44 into the gap 13 between the main shaft outer cylinder 10 and the outer ring 12A, and then fit the wedge piece 44 between a pair of pieces 43.

In this way, the pieces 43 are pushed out in the direction of an arrow, so that adjacent pieces 42 and 43 are brought into close contact with each other, and also each of the pieces 42 and 43 is pressed against the inner circumferential surface of the main shaft outer cylinder 10. Accordingly, the gap 13 between the main shaft outer cylinder 10 and the outer ring 12A of the main bearing 12 is able to be reliably filled by the plate 40.

As described above, the bearing repairing method of this embodiment includes the step of inserting the plate 40 between the main shaft outer cylinder 10, which is fixed to the outer ring 12A of the main bearing 12, and the outer ring 12A of the main bearing 12 and the step of fixing the plate 40 to the main shaft outer cylinder 10. Then, slip is permitted between the plate 40 and the outer ring 12A.

In this manner, by inserting the plate 40 between the main shaft outer cylinder 10 and the outer ring 12A of the main bearing 12, and also fixing the plate 40 to the main shaft outer cylinder 10, it is possible to fill the gap which occurred between the main shaft outer cylinder 10 and the outer ring 12A by the plate 40. In addition, since slip is permitted between the plate 40 and the outer ring 12A, even in a case where a high load due to strong wind suddenly acts on the main bearing 12, an excessive shear force is not applied to the plate 40. Accordingly, since the filling state of the plate 40 is not deteriorated due to an excessive shear force, the gap 13 which occurred between the main shaft outer cylinder 10 and the outer ring 12A of the main bearing 12 is able to be more permanently repaired.

Here, it is preferable that the plate 40 be divided into a plurality of pieces 42 and 43 including the wedge piece 44, and in the step of inserting the plate 40, a plurality of pieces 42 and 43 except the wedge piece 44 are inserted into the gap 13 between the main shaft outer cylinder 10 and the outer ring 12A of the main bearing 12, and then the wedge piece 44 is fitted between a pair of pieces 43.

In addition, it is preferable that the plate 40 is made of a resin material having a specific abrasion amount of $1.0 \times 10^{-9}$ mm$^3$/Nmm or less and a coefficient of static friction of 0.15 or less.

Further, since the power of the wind which the blades 8 are subjected to is always applied to the main bearing 12 of the wind turbine generator 1 as a load, in particular, the reduction in thickness of the main shaft outer cylinder 10 fixed to the outer ring 12A of the main bearing 12 easily progresses. It is effective if the main shaft outer cylinder 10 in which the reduction in thickness easily progresses in this manner is repaired by the bearing repairing method of this embodiment.

In particular, as shown in FIG. 2, in a case where the main bearing 12 is separated from the nacelle bedplate 21, according to the bearing repairing method of this embodiment, the repair is able to be performed without detaching the main bearing 12 from the wind turbine generator 1, so that work efficiency is greatly improved.

Although one example of the present invention has been described above, it goes without saying that the present invention is not limited to this, but may be variously improved or modified within the scope that does not depart from the essential points of the invention.

For example, in the above-described embodiment, a processing prior to the insertion of the plate 40 into the gap 13 between the main shaft outer cylinder 10 and the outer ring 12A of the main bearing 12 is not particularly described. However, as described below, before the insertion of the plate 40, a portion of the main shaft outer cylinder 10 may also be cut away for easy insertion of the plate 40.

Figure 7:
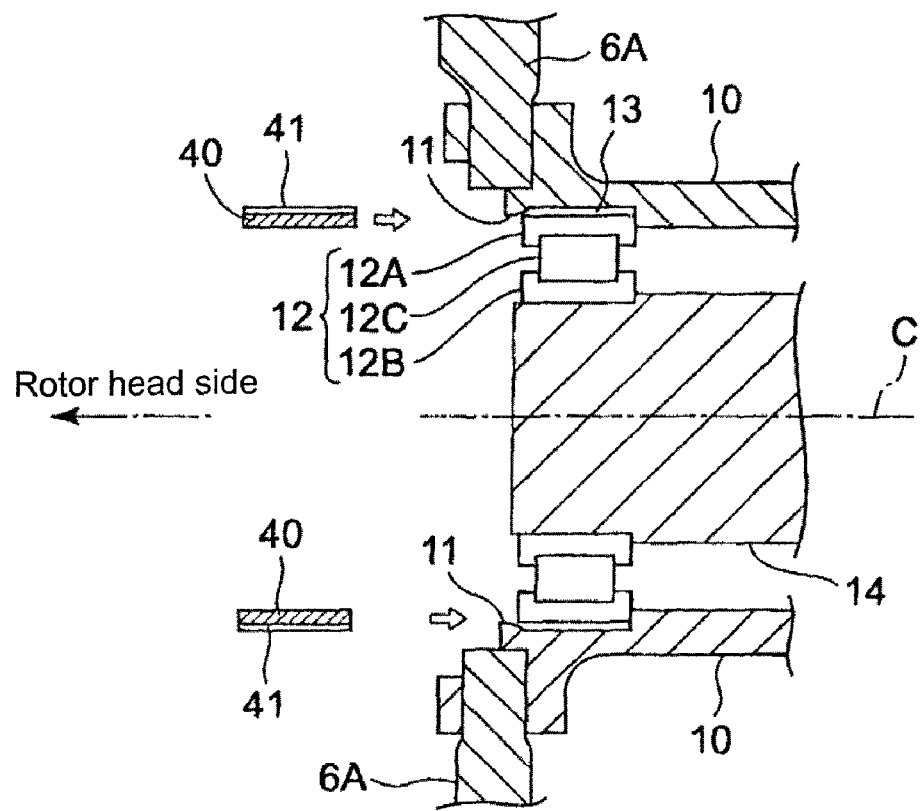
FIG. 7 is a cross-sectional view illustrating the surroundings of the main shaft outer cylinder and the main bearing.

FIG. 7 is a cross-sectional view illustrating the surroundings of the main shaft outer cylinder 10 and the main bearing 12.

The reduction in thickness of the main shaft outer cylinder 10, which occurs due to the fact that the outer ring 12A of the main bearing 12 relatively rotates with respect to the main shaft outer cylinder 10 due to a sudden high-load, does not always progress at a constant speed in relation to an axial direction of the main bearing (in this case, the rotary shaft C). For example, in a case where an end face of the main shaft outer cylinder 10 is protruded further outward (in this case, to the rotor head 6 side) than an end face of the outer ring 12A of the main bearing 12, the reduction in thickness of the main shaft outer cylinder 10 hardly occurs in the protruded end face of the main shaft outer cylinder 10, and as shown in FIG. 7, a non-thinning portion (a portion in which a thickness is not reduced) 11 is formed at the end face of the main shaft outer cylinder 10. In this case, the non-thinning portion 11 formed at the end face of the main shaft outer cylinder 10 stands in the way, so that it is difficult to insert the plate 40 into the gap 13 between the main shaft outer cylinder 10 and the outer ring 12A.

Therefore, before the insertion of the plate 40, the end face (that is, the non-thinning portion 11) of the main shaft outer cylinder 10 in the surroundings of the outer ring 12A may also be cut away so that an insertion opening for inserting the plate 40 between the main shaft outer cylinder 10 and the outer ring 12A is formed. In this way, the plate 40 is able to be easily inserted into the gap 13 between the main shaft outer cylinder 10 and the outer ring 12A.

The invention claimed is:

1. A method of repairing a bearing of a wind turbine generator, comprising the steps of:
    inserting a plate into an annular gap between a circumferential surface of a constituent member of the wind turbine generator, which is fixed to a bearing ring of the bearing, and a circumferential surface of the bearing ring of the bearing; and
    fixing the plate to the constituent member of the wind turbine generator,
    wherein slip is permitted between the plate and the bearing ring of the bearing,
    the constituent member is a main shaft outer cylinder of the wind turbine generator, and
    the bearing is a main bearing in which an outer ring is fixed to the main shaft outer cylinder.

2. The method according to claim 1, wherein the plate is made of a resin material having a specific abrasion amount of $1.0 \times 10^{-9}$ mm$^3$/Nmm or less and a coefficient of static friction of 0.15 or less.

3. The method according to claim 1, wherein the main bearing is separated from a nacelle bedplate of the wind turbine generator.

4. The method according to claim 1, further comprising the step of coating only one surface of the plate on a side of the constituent member with an adhesive before the step of inserting the plate,
    wherein slip is permitted between the plate and the bearing ring of the bearing while the plate is fixed on the constituent member by the adhesive.

5. A method of repairing a bearing of a wind turbine generator, comprising the steps of:
    inserting a plate between a constituent member of the wind turbine generator, which is fixed to a bearing ring of the bearing, and the bearing ring of the bearing; and fixing the plate to the constituent member of the wind turbine generator,
wherein the plate is divided into a plurality of pieces including a wedge piece, and
in the step of inserting the plate, the plurality of pieces except the wedge piece is inserted between the constituent member of the wind turbine generator and the bearing ring of the bearing, and then the wedge piece is fitted.

6. The method according to claim 5, wherein slip is permitted between the plate and the bearing ring of the bearing.

7. The method according to claim 5, further comprising the step of coating only one surface of the plate on a side of the constituent member with an adhesive before the step of inserting the plate,
wherein slip is permitted between the plate and the bearing ring of the bearing while the plate is fixed on the constituent member by the adhesive.

8. A method of repairing a bearing of a wind turbine generator, comprising the steps of:

inserting a plate between a constituent member of the wind turbine generator, which is fixed to a bearing ring of the bearing, and the bearing ring of the bearing; and
fixing the plate to the constituent member of the wind turbine generator,
wherein the method further comprises the step of cutting away an end face of the constituent member in surroundings of the bearing ring so that an insertion opening for inserting the plate between the constituent member and the bearing ring is formed, before the step of inserting the plate.

9. The method according to claim 8, wherein slip is permitted between the plate and the bearing ring of the bearing.

10. The method according to claim 8, further comprising the step of coating only one surface of the plate on a side of the constituent member with an adhesive before the step of inserting the plate,
wherein slip is permitted between the plate and the bearing ring of the bearing while the plate is fixed on the constituent member by the adhesive.

* * * * *